UNITED STATES PATENT OFFICE.

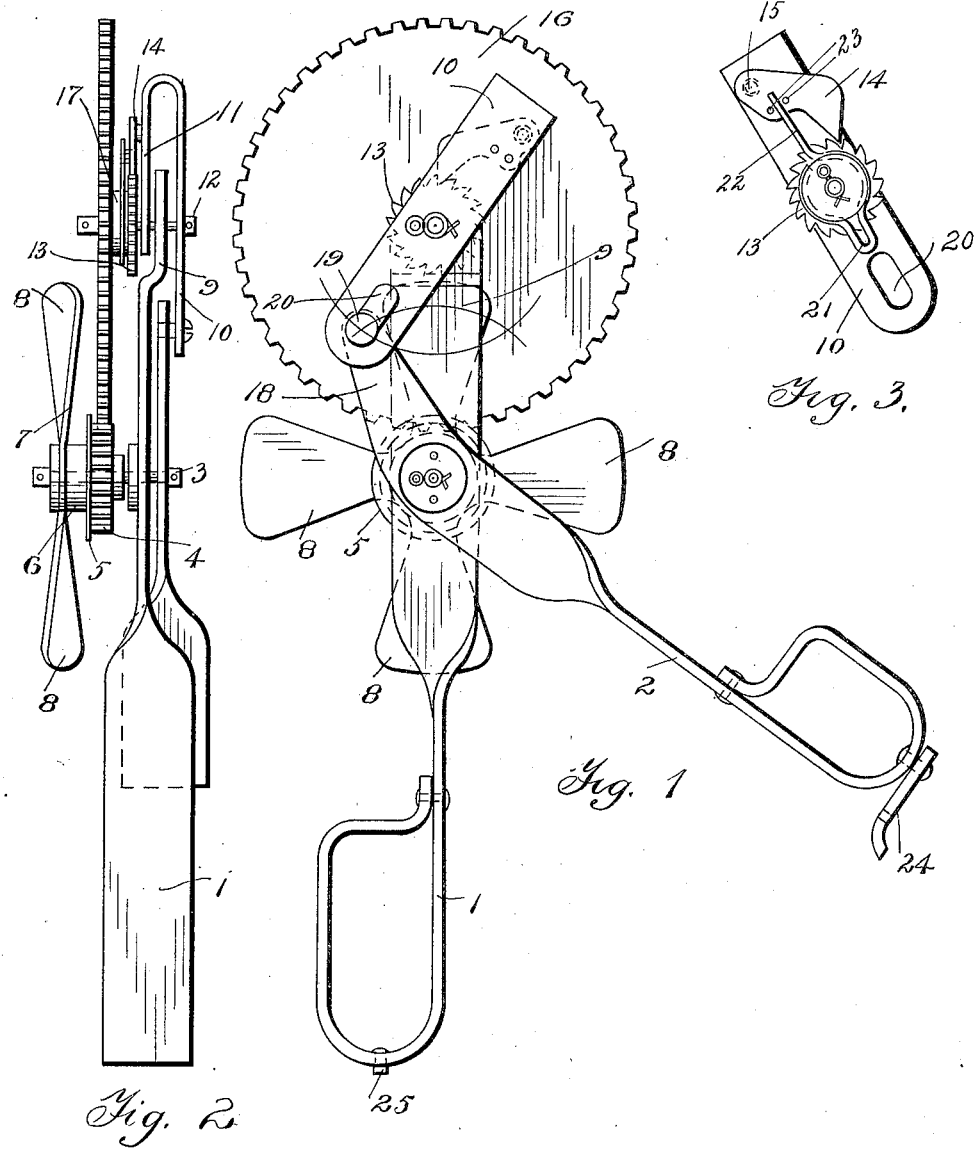

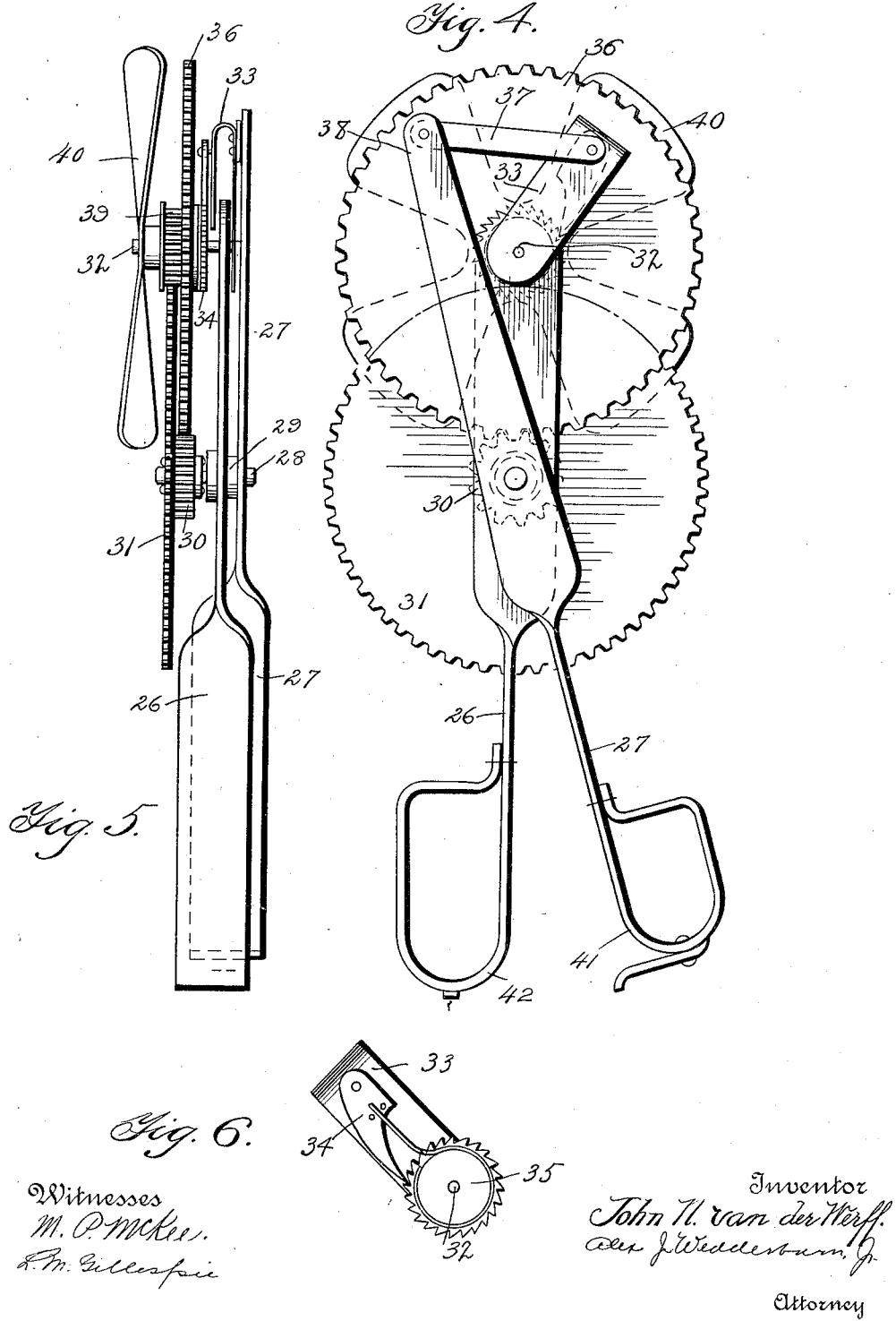

JOHN N. van der WERFF, OF SWISSVALE, PENNSYLVANIA.

INTERMITTENT GRIP.

1,057,598. Specification of Letters Patent. Patented Apr. 1, 1913.

Application filed October 17, 1910. Serial No. 587,441.

*To all whom it may concern:*

Be it known that I, JOHN N. VAN DER WERFF, subject of the Netherlands, residing at Swissvale, in the county of Allegheny and State of Pennsylvania, have invented certain new and useful Improvements in Intermittent Grips, of which the following is a specification.

This invention relates to improvements in fans, and particularly to fans for individual use, and it has for its principal object, to provide a fan which will cause the greatest amount of draft for the least exertion.

With the above and other objects in view, I have invented the fan illustrated in the accompanying drawings in which, Figure 1 is a rear elevation of my improved fan, Fig. 2 is a side elevation thereof, Fig. 3 is a view of a gear operating device. Fig. 4 is a rear elevation of a modified form, Fig. 5 is a side elevation of Fig. 4, and Fig. 6 is a detail view of a ratchet and operating member.

Referring to the drawings 1 indicates a fixed handle to which is pivotally connected a second handle 2 by means of a shaft 3. On this shaft is also mounted a small gear wheel 4, which has a projecting flange 5. Next to this gear on the shaft 3 is a spacer 6, which is adapted to space a fan 7 mounted on the shaft 3, and is provided with twisted blades 8, a sufficient distance away from the working mechanism to prevent the blades from contacting said working parts. The members 4, 5, 6, and 7 are fixedly secured to one another and revoluble on the shaft 3.

The upper end of the handle 1 has an offset portion 9 to which is pivotally connected, by means of a shaft 12, an oscillating member 10 which is fixedly secured to said shaft. This member has a bent end 11 which straddles the offset portion 9 of the handle 1. On the shaft 12 is also mounted a ratchet wheel 13, which is operated by a pawl 14, pivoted to the upper part of the member 11 at 15. Also mounted on the shaft 12 is a large gear wheel 16, this gear wheel is fixedly secured to the ratchet wheel 13 through the medium of a spacer 17, all of which are revoluble on the shaft 12.

The handle 2 has an extension 18 thereon, to which is fixed a screw pin 19, which works in a slot 20 in the lower end of the member 10.

In operation, when the handle 2 is drawn toward the handle 1 the angularly disposed end thereof being pivoted to the member 10, draws that member in a direction opposite to the movement of the handle and causes the pawl 14, which engages the ratchet wheel 13, to revolve, that wheel thereby revolving the large gear wheel 16, which in turn revolves the small gear wheel 4, and the fan 7 to which it is secured. When the handle is shoved in a reverse direction, it causes the member 10 to swing back in such a position that the pawl carried thereby is again in a position to operate the ratchet wheel on the next movement of the handle. The revolution of the gears and fan do not change or cease on the reverse motion of the handle but continue in the same direction until the momentum is gradually overcome, as these revolving members are all loosely mounted on the shafts, therefore only an intermittent movement of the handle is necessary to keep the fan in continual motion. The speed of the revolution of the fan, can, of course, be regulated by the operator.

An expansion spring 21 is secured to the ratchet wheel 13 and its free end is loosely held by a pair of pins 23, and on the reverse motion of the member 10, the spring expands sufficiently to slightly raise the pawl 14 from engagement with the ratchet wheel thereby preventing the clicking noise which would otherwise be manifest.

On the end of the handle 2 is a hook 24 which is adapted to engage the pin 25 on the handle 1 and hold the handles closed.

In Figs. 4 and 5 another form of the invention is shown. In this arrangement the arms 26 and 27 are pivotally mounted on a shaft 28 and separated by a washer 29. Upon this shaft is mounted a gear 30 and a gear 31, which are rigidly connected. On the upper end of the arm 26 is journaled a shaft 32 and upon the outer end of this shaft is mounted an oscillating member 33, which is bent over and returned on the inner side of the end of the arm 26, on this member is a pawl 34, which operates a ratchet wheel 35, this ratchet wheel is fixed to a gear wheel 36 which is also mounted in the shaft 32. A link 37 connects the upper end 38 of the arm 27 with the member 33. Also loosely mounted on the shaft 32 is a gear wheel 39 and a bladed fan 40, which are fixedly connected. The device operates as follows: When the handle 41 of the arm 27 is brought toward the handle 42 of the arm 26 an operation occurs which causes the link 37 to swing the member 33, thus making the pawl 34 revolve the wheel 35 and the gear 36. The latter revolves the gear 30 and the gear 31 which is fixed thereto, the latter gear revolves the gear 39, which revolves the fan, this arrangement of gears causes the fan to revolve very rapidly.

I claim and desire to secure by Letters Patent:—

1. A device of the kind described comprising two flat shanks formed with handle portions, an elongated shaft tapped through said shanks at one end and adapted to receive at its other end a member to be rotated, a terminal offset formed upon one of said shanks, being parallel to said first and second shanks and movable to an alining position over the other shank, a shaft revolubly mounted in said offset, an inverted U-shaped member straddling said offset and having both its legs mounted on said last-named shaft, a pawl carried by one of said legs, and a ratchet wheel on said last-named shaft engaged by said pawl and rotating a spur wheel, the non-pawl-carrying leg of said member formed with a longitudinal slot, the free end of the other shank formed with an inclined portion carrying a stud working in said slot, said inclined portion, when said handles are separated the greatest distance, being obliquely-disposed of the axis of the opposite shank and holding said member obliquely-disposed relatively to said last-named shank in a direction opposite to its own.

2. In combination, two handles having shanks, pivoted together, a shaft carried by one of said shanks above the other, an inverted U-shaped member having its legs mounted on said shaft and straddling said shaft-carrying shank, a ratchet-wheel on said shaft, a pawl mounted on said member and engaging said wheel, a lever arm formed integrally upon the other shank, said member formed with an elongated slot, and a stud on said lever arm working in said slot, said arm actuating said member, as the handles are closed, to cause said pawl to move said wheel.

3. In combination a support, a pivot on said support, a shaft revolubly mounted in said support above said pivot, a ratchet wheel on said shaft, an inverted U-shaped member straddling said support and having its legs mounted on said shaft, a pawl fixed on one leg of said member engaging said ratchet wheel, and a lever arm on said pivot pivotally connected to the other leg of said member to oscillate it to cause said pawl to rotate said wheel.

In testimony whereof I affix my signature, in presence of two witnesses.

JOHN N. van der WERFF.

Witnesses:
  VICTOR KOLASIŃSKI,
  W. M. SOSZYNSKI.

---

Copies of this patent may be obtained for five cents each, by addressing the "Commissioner of Patents, Washington, D. C."